Sept. 18, 1951 P. M. G. TOULON 2,568,375
SIGNAL DISTRIBUTION SYSTEM
Filed April 6, 1949 4 Sheets-Sheet 1

INVENTOR
PIERRE MARIE
GABRIEL TOULON

BY William L. Lieberman
ATTORNEY

INVENTOR
PIERRE MARIE GABRIEL TOULON

Patented Sept. 18, 1951

2,568,375

UNITED STATES PATENT OFFICE 2,568,375

SIGNAL DISTRIBUTION SYSTEM

Pierre Marie Gabriel Toulon, Neuilly-sur-Seine, France, assignor to Products & Licensing Corporation, New York, N. Y., a corporation of Delaware Application April 6, 1949, Serial No. 85,906
In France April 8, 1948

13 Claims. (Cl. 177—353)

1

The present invention relates to a new process for creating on the terminals of a generator successive voltage impulses, whose duration and amplitude are exactly defined, and particularly impulses in trapezium form. More particularly the invention relates to the creation of voltage impulses which are necessary to assure static distribution, among several independent channels, of signals which arrive sucessively by a single lead.

I succeed in assuring this static distribution, by using rectifiers in particular. For example, all the independent channels are fed in parallel by the common lead I install serially in each channel a valve, and I dispose, furthermore, a battery polarized in such a direction that all the rectifiers are normally blocked. In series with each rectifier, I connect an inductance or a resistance in which (by means of an inductive coupling or by capacity) a voltage can be made to appear at a given moment and for a brief duration. The induced voltage is very complex; it is a "peak" voltage, constituted of superimposed voltages of various frequencies. Its maximum is produced alternately in each one of the channels. The "peak" of voltage has the effect of compensating for the polarization of the battery, and thereby of unblocking the rectifier.

Until now, a voltage presenting a very accentuated maximum at a given moment of the period has been used; that is to say the peak of a curve has been used, having approximately the form of a sinusoid, whose amplitude compensated the battery. In many cases, this approximate solution can suffice; but "peaks" in rounded form, considering the shape of the curve from its peak as a function of time, is not very satisfactory, especially when extremely precise operation is desired. It very often happens, then, that the signal subject to distribution is not transmitted completely, if the system which assures the unblocking of the line is only approximate. This happens, for example, if the timing of arrival of the signal is not in rigorous synchronism with the timing of the peak of the complex curve, which compensates for the battery voltage; or, it can also happen (notably as an outcome of the variations in the voltages of the network), that the amplitude of the complex voltage which assures the unblocking of each line takes on different values, and consequently the peak of voltage instead of being exactly equal to the value of the battery, is weaker or stronger than the latter, that is to say, the amplitude of the maximum varies in the course of time. This defect is not

2 grave, if the "peak" of voltage acts only on the unblocking grid of an amplifying tube disposed in each track, because the tube then exercises a saturating effect, which is why such amplifying tubes have always been used in practice. But the defect becomes absolutely prohibitive when utilizing, as the invention proposes, simple rectifiers; nevertheless, this solution is the preferable one, because it is the simplest and most economical. It is a primary object of the present invention accordingly to render possible the use of rectifiers in systems of the above character.

According to the invention, instead of using directly the peak of this complex voltage to unblock the switch rectifier of each track, I utilize it only to create a fall in the voltage existing in resistances disposed serially across a rectifier, which is itself disposed in such a way as to permit that current to pass which the peak of voltage produces. The amplitude of the fall of voltage at the terminals of one of these resistances is limited by an auxiliary rectifier appropriately polarized by a voltage practically equal to that of an unblocking battery of the different tracks. The only purpose of the other resistance is to limit the current. I succeed in this way in generating voltage impulses having about the form of a trapezium, whose amplitude is very exactly defined.

The pulses in trapezium form are utilized advantageously to measure the rapid storing of signals in each one of a plurality of independent channels. They can also be used for the discharge of these signals, after a predetermined time, and immediately before the arrival of a new signal.

The accompanying drawings enable a better comprehension of the objects, features and advantages of the invention, and its mode of operation as exemplified in specific embodiments thereof.

All of these figures are provided as examples only, and without any restrictive or limiting intent as to the scope of the invention.

Figure 1:
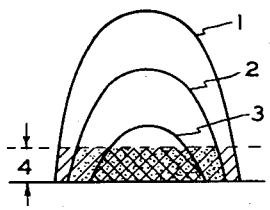
Figure 1 illustrates, as a function of time, several superposed voltage pulses, corresponding to amplitudes of output of a generator, and which are very different from each other in amplitude, and brings out thereby the fundamental role played by the limiting-rectifier of the present invention.

In Figure 1, there is illustrated voltage impulses 1, 2 and 3, having very different amplitudes. On the other hand, the reference numeral 4 represents, in cross-hatch, the very precise amplitude of the pulses which clipping permits one to obtain, according to the invention.

Figure 2A:
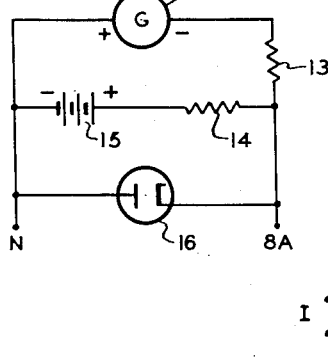
Figure 2A is taken from Figure 2, and represents the principle of the voltage limiter.
Figure 2:
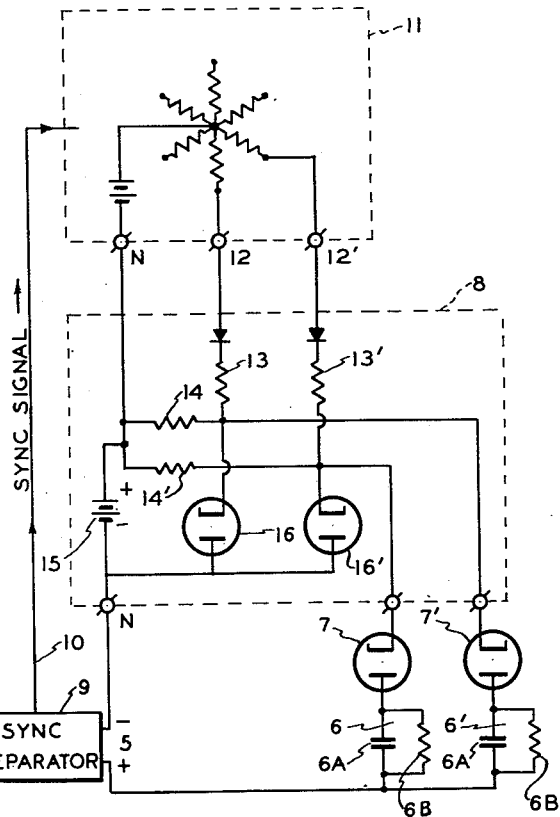
Figure 2 is a schematic diagram of a distributor which utilizes the "trapeze" pulses, according to the invention.

Reference is now made to Figure 2 of the drawings, which figure is a schematic diagram permitting switching successively into each one of the independent channels 6, 6', etc. (each one represented by a condenser 6A shunted by a resistance 6B), the signals which arrive successively via the common lead 5. I install serially on each channel 6 a rectifier, as 7, 7' . . ., and a voltage generator having the effect of blocking and of unblocking alternately each rectifier 7, 7' . . . I have designated by I the input circuit, by which the useful signals and the synchronizing signals arrive at the same time.

Element 9 has the effect of separating the useful signals on the common lead 5, and the synchronizing signals on lead 10. In general the synchronizing signals are easy to separate, whether their direction or their amplitude differ from the useful signals, or whether the times of their occurrence be different.

By the aid of synchronizing pulses on lead 10, and according to a technic described by the present inventor in his various patents, I interconnect one or more oscillators (block 11) whence I derive by additive synthesis of several sinusoidal voltages, for application to terminals 12, 12', etc., complex voltage waves shifted in time in relation to one another.

The invention, illustrated in block 8, consists of transforming the voltage impulses furnished at the terminals 12, and of an amplitude which may be very irregular and of relatively high value, into impulses of relatively feeble amplitude, and very exactly defined in amplitude, at the terminals feeding the valves 7, 7' . . .

To arrive at this result, the invention provides across each pair of terminals 12, two resistances 13 and 14, connected in series, and to limit the drop in voltage in the resistance 14 by means of a valve 16 appropriately polarized by a battery 15, and connected across resistance 14. I utilize the voltage drop created across resistance 14 to feed valve 7, which serves to accomplish switching to the first channel.

Figure 2A, taken from Figure 2, illustrates a circuit employing the principle of the voltage limiter; the same parts being designated by the same reference numerals. When the generator G feeds the resistances 13 and 14, in series with the battery 15, the valve 16 prevents the drop in voltage in the resistance 14 from going above the voltage of the battery 15, which brings about thereby the limitation desired. As a matter of fact, as soon as the voltage at the terminals of the resistance 14 goes above that of the battery 15, the resultant voltage creates a current flow in the valve 16, which reduces the voltage at the terminals automatically to be equal to that of the battery 15.

The neighboring terminals 12', etc., are connected likewise in a group of two resistances 13', 14', etc. The drop in voltage in the resistances is likewise limited by a polarized valve 16'. The operation of the system of switching is readily understandable. Assume first that all the terminals 12, 12', etc., of the generator 11 do not deliver any current. No drop in voltage is produced in the resistances 13, 14, 13', 14', etc., and, accordingly, all of the rectifiers 7 are blocked by the battery 15.

The voltage in peak form, which appears at each terminal 12, passing across the valve generates in the resistances 13 and 14 a peaked current. The drop of voltage created by this current in the resistance 14 is limited by the valve 16.

This difference in potential annuls momentarily the effect of the battery 15, in such a way that the first signal is switched toward channel 2. It being assumed that the drop of voltage in the resistance 14 corresponds very exactly to the value of the battery 15, compensation is perfect.

Figure 3:
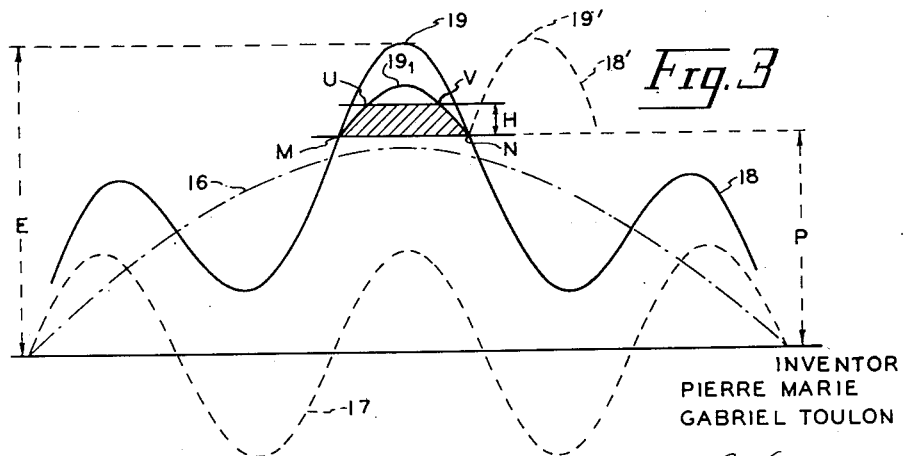
Figure 3 represents, on an enlarged scale, the curve of the "trapezium"

The advance presented by the present invention will be better appreciated by reference to Figure 3, which represents as a function of time, the form of the voltage impulses utilized in the prior art, as compared with that which the system of the present invention permits one to obtain.

The method described in my previous patents, to assure distribution among several independent channels of signals arriving successively by a single channel, consists of generating polyphased tensions, at frequencies $K_1F$, $K_2F$, which are different multiples of the frequency F of the recurrence of the signals in each channel, in such a way as to synthesize peaks of voltage, which are utilized in each of the channels in series with a rectifier.

In Figure 3, I have represented at 16, as a function of time, the amplitude of the voltage at the frequency F (assuming $K_1=1$) and in 17 the frequency $K_2F$, (assuming $K_2=5$). I have represented at 18 the sum of these two voltages, which constitute one of the complex voltages of the generator, presenting a very accentuated maximum 19. This complex voltage has been used in the past for unblocking the first channel. I have represented by dotted lines another complex curve, 18', having the same form as the preceding one, and presenting, at 19', a very accentuated maximum, which is utilized to unblock the second channel. The curve 18', with its peak 19', is formed in the same manner as the curve 18, with its peak 19, by combining properly phased sinusoidal voltages, of selected frequencies. The relative time displacements of peaks 19 and 19' are accomplished by suitable selection of phases of the component sinusoidal waves. I have utilized, in the past, a polarizing battery, whose amplitude, shown in E, corresponds about to that of the maxima 19, 19', in such a way that the induced complex voltage almost compensates for the battery voltage at the moments of these maxima. This arrangement presented certain difficulties; the rectifier having the function of unblocking each channel is submitted to a very high inverse voltage, (equal to twice the amplitude E), with attendant danger of breakdown. The battery in circuit with the current generator, which furnishes the voltage E, must be very stable.

For the same reason, the elementary voltages (in phase and in quadrature), which serve to synthesize the complex unblocking voltage must be very exactly stabilized. If, as a matter of fact, the condition is not realized, the compensation is imperfect, and the unblocking is not correctly effectuated, (either the peak 19 gives beyond the amplitude of the polarization E, in which case a stray signal appears in the independent track, even in the absence of a transmitted signal, or the peak fails to attain the amplitude E, in which case the signal transmitted, coming from the common line, is partially cut off).

Finally, if the signals which are synthesized are not perfectly synchronized with the maxima 19 of the complex wave, that is to say, if they present any relative advance or delay, the unblocking is not correct, because the induced voltages remain then, in either case, below that of the polarization voltage E.

All of these defects are avoided by generating, in conformity with the present invention, an unblocking pulse having an exactly defined amplitude H, and in the form of a trapezium. In Figure 3, I have represented at MUVN the pulse which the system of Figure 2 enables one to obtain; I obtain it also with the arrangement of Figure 4, wherein is again found the fundamental elements already described in connection with Figure 2. The upper part of the schematic diagram of Figure 4 treats of the operation of storing the impulses in each condenser (6A) associated with each line, and the lower treats of the discharge.

Figure 4:
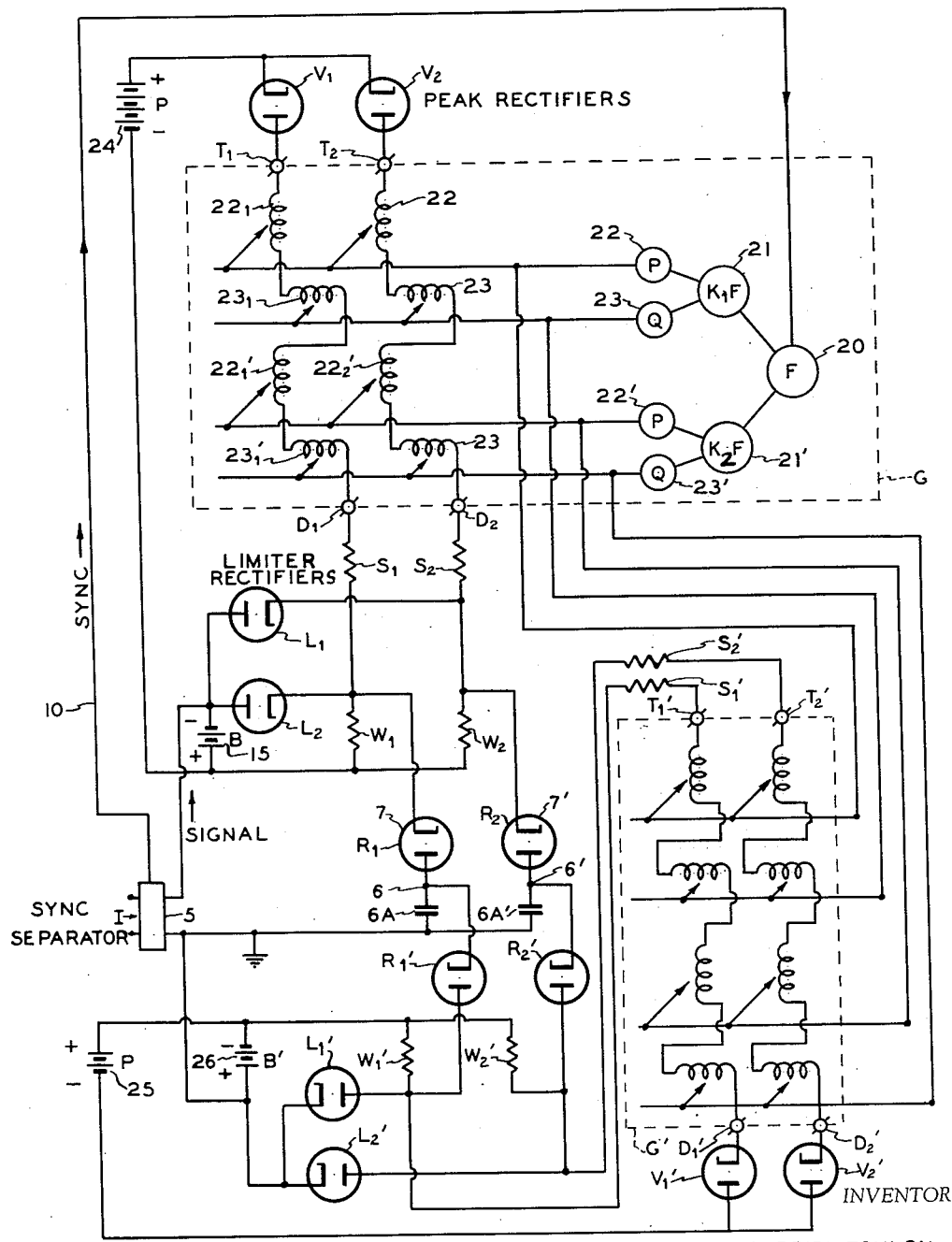
Figure 4 is another schematic diagram of a circuit arrangement which assures successively the storing and then the discharge of the pulses.

1.—*Storing.*—In this Figure 4, I have designated by I the transmission channel, over which the useful signals and the synchronizing signals arrive at the same time.

I have represented by block 9 the circuits which separate the synchronizing pulses into lead 10, and the useful signals into the common lead 5. I also propose to distribute the signals which arrive successively over lead 5 among the independent leads 6, 6', etc. I have designated as block G components which generate peaked voltages by synthesis.

As in the usual technique, I use an oscillator 20 synchronized in response to signals arriving over lead 10 at the frequency of the pulses in each lead (frequency F). This generator drives several oscillators 21, 21', etc., at the frequencies $K_1F$, $K_2F$, respectively, which are harmonics of the fundamental frequency F.

Beginning with these oscillators, I generate at each frequency, voltages in windings 22, 23, 22', 23', respectively, in phase and in quadrature. Each one of these windings serves to impress on the terminals TD of the generator, by additive synthesis, the complex voltages having a very sharp maximum, at a given moment of the period F. These voltages are obtained by couplings of appropriate signal amplitudes present on the coils 22, 23, 22', 23'. This technique has already been described in French Patent No. P. V. 552,650 (March 30, 1948), having the title: New Generator of Complex Electric Tensions, Intended Notably for the Distribution of Impulses. We have represented by $T_1$, $D_1$, the first of these complex tensions obtained by means of the couplings $22_1$, $23_1$, $22'_1$, $23'_1$, having appropriate values. I obtain at $T_2$, $D_2$, the second of these complex voltages obtained from the windings $22_2$, $23_2$, $22'_2$, $23'_2$, by suitable choice of intercoupling values. The choice of the coupling values (notably the number of turns of the transformer) enables determination of the "phase" of the maximum of the complex voltage generated in each channel, as already explained in the patent cited.

In the present diagram, terminals $T_1$, $T_2$, etc., are available on one side, terminals $D_1$, $D_2$ on the other. I connect to terminal $D_1$, a group of two resistances $S_1$ and $W_1$ in series with the terminal $T_1$. Likewise the resistances $S_2$ and $W_2$ are connected in series with the terminal $T_2$, etc. Each junction point of the group of two resistances, as $S_1$, $W_1$, or $S_2$, $W_2$, is tied to the cathode of a valve, as $L_1$, $L_2$ for limiting voltage amplitude. The anode of this tube is appropriately polarized by a battery 15, of voltage B. On the other hand, the other terminal $T_1$ is tied to the anode of a valve $V_1$. Likewise the terminal $T_2$ of the neighboring complex voltage is tied to the anode of a valve $V_2$. The cathodes of these valves are polarized by a battery 24, with voltage P. The common lead F is connected to the negative pole of the battery 15. Each independent lead 6, 6', etc. (represented here by a capacity 6A, 6'A, etc.) is connected between ground and the rectifiers 7, 7'. I have designated these rectifiers $R_1$, $R_2$, as "switching rectifiers," while I have designated the first auxiliary rectifiers $V_1$, $V_2$, etc., as "peak rectifiers," and the second auxiliary rectifiers $L_1$, $L_2$, as "limiter rectifiers."

The resistances S, of Figure 4, perform the same functions as the resistances 13 of Figure 2; the resistances W the same role as the resistances 14, the valves L the same role as the valves 16, the battery B the same role as the battery 15.

The functioning of the device may be easily understood, by referring again to Figure 3. As long as the voltage of one of the anodes of the rectifier of "peak rectifier" $V_1$ fails to attain the amplitude P, of the battery 24, that is to say, as long as point M of curve 18 has not been reached, no current (Fig. 3), is passed by the resistances $S_1$, $W_1$. I have represented by MN the amplitude P of the battery 24, at the point where the rectifier $V_1$ begins to pass current. If we admit that the voltage drop in the rectifier $V_1$ is negligible, and that the voltage sources are capable of delivering considerable current, the drop of voltage in the group of the two resistances $S_1$ and $W_1$ is represented, on an appropriate scale, by the curve M, 19, N. This drop in voltage may be decomposed into two parts, that which appears in the resistance $W_1$, being that which is included between the horizontal MN and the curve $19_1$. At the point U, that is to say, when the potential of the cathode of the rectifier $L_1$ surpasses the quantity H, corresponding to the value of the battery B, this rectifier $L_1$ begins to pass current. It limits thereby in a very perfect manner the amplitude of the drop in voltage in the resistance W, at the ordinate H comprised between the horizontal line MN and the horizontal line UV. The drop in voltage in the resistance S, about which we need not concern ourselves, corresponds, of course, always to the region between the horizontal line UV and the peak of curve 19. When the complex voltage begins to decrease, there is a moment when the rectifier $L_1$ ceases to conduct (point V). The fall in voltage in the resistance $W_1$ is represented again by the distance between the horizontal line MN and the curve $19_1$, while the fall in voltage in the resistance $S_1$ corresponds to the vertical distance between the curves $19_1$ and 19. It is thus explained how the trapezium with curvilinear sides MUVN has been obtained. This trapezoidal pulse is especially perfect for assuring distribution of pulses. As has already been described in connection with Figure 2, all the independent lines 6, 6', etc., each one of which comprises a condenser, as 6A, 6'A . . . , are fed in parallel by the common line 5, across the polarization battery B, of value H, and across a switching rectifier R. Normally no voltage appears in the resistance W, and all of the lines are, therefore, normally blocked. The circuit arrangement has the effect of successively creating in each resistance W a drop in voltage, precisely equal and opposite to H, which compensates exactly the voltage of battery B.

*Discharge.*—To accomplish a rapid discharge of the condenser 6 at the end of a predetermined time, as shown in the lower part of the Fig. 4, I utilize an auxiliary rectifier R', oriented in the reverse direction of the rectifier R, and a polarizing battery B' normally blocking the rectifier R', and a generator of pulses for unblocking the rectifier periodically.

As illustrated in Figure 4, I utilize an auxiliary generator G' (which can be fed in parallel with the principal generator G). The generator G' utilizes symmetrical voltages derived from the original generator G, but appropriately shifted in time in relation to them. The generator G', will induce in the circuits $D_1'$, $T_1'$, $D_2'$, $T_2'$, complex voltages, each presenting a highly peaked maximum, at a predetermined moment. Due to the resistances $W'_1$, $S'_1$, $W'_2$, $S'_2$, and to the valves $V_1'$, $V_2'$, etc., voltage pulses are generated. These pulses are in turn transformed into trapezoids because of the valves $L'_1$ $L'_2$, and in accordance with the process explained above. The direction of the trapezoid and the time of occurrence are chosen in such a way as to cause the valves R' to pass current at the appropriate moment, that is to say, immediately after the arrival of a new impulse in each line.

Figure 5:
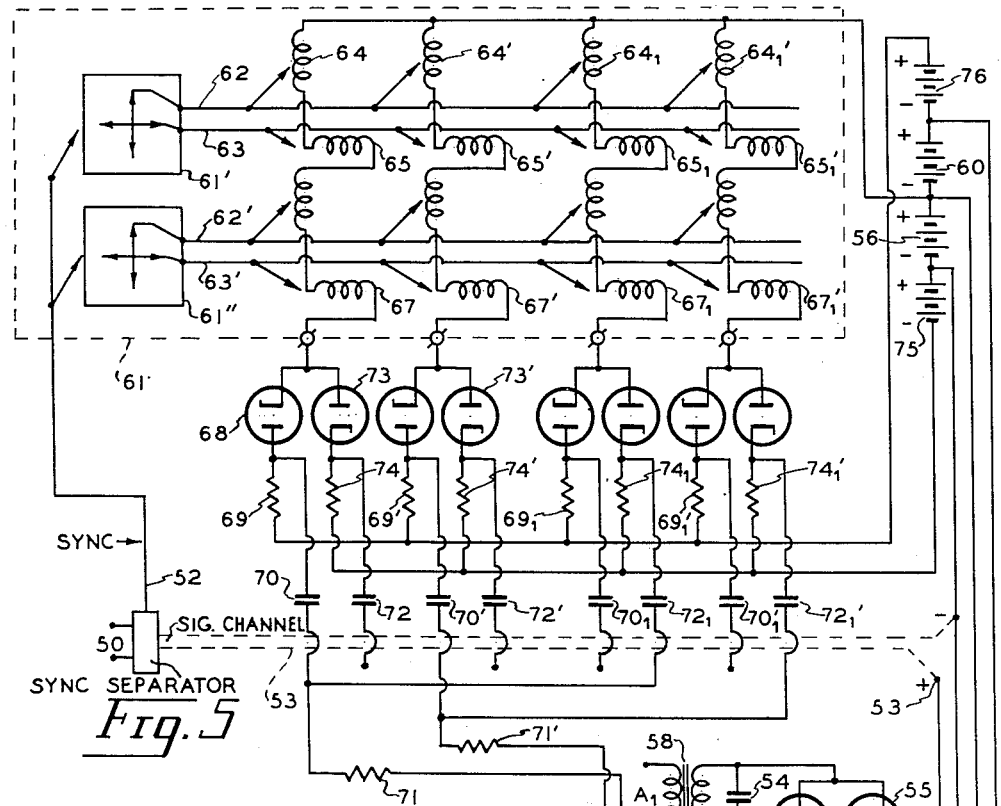
Figure 5 is a perfected variant of a system in which is utilized the same terminals of a complex voltage generator to assure the storing and the discharge of the pulses.

Figure 5 illustrates a variant of the system of Fig. 4, in which I use the terminals of complex generator 61 to create alternately in each resistance 71 trapezoidal voltage pulses which are alternately positive and negative, and which enable successive storage and discharge of impulses.

I have designated by 50 the line by which the useful signals and the synchronizing signals arrive, and by 51 the circuit which separates the useful signals to line 53 and the synchronizing signals to line 52. The synchronizing peaks of complex voltage are generated in block 61. The generator 61 consists essentially, as has been explained in the cited patent, of a plurality of harmonic oscillators 61', 61'', oscillating at the recurrence frequencies of the signals. After amplification, there is obtained diphased distributions 62, 63, 62', 63', etc., at each of the frequencies $K_1F$, $K_2F$, etc.

According to the embodiment of my invention, illustrated in Fig. 5 of the accompanying drawings, each terminal of the generator 61 feeds two rectifiers at the same time, connected in inverse parallel, or back-to-back. These rectifiers are polarized, respectively, by batteries 75 and 76, in such a way as to pass current only at the peaks of voltage. The first terminal of the generator 61 feeds on one hand the cathode of valve 68, which passes current to the resistance 69; and on the other hand, the anode of the valve 73 which passes current to the resistance 74. The voltage pulse created in this resistance is passed by a coupling capacity 70, of rather high value. The form of the voltage collected in the group of two resistances 71 and 57, disposed in series, is not exactly that of the peak of voltage furnished in the resistance 69, but differs by a slight shift of the zero of the curve. This slight shift is not disadvantageous, as will become apparent hereafter.

An analogous pulse, but of the opposite sign (positive peak), is created by the rectifier 73 in the resistance 74. The voltage impulse which appears on this resistance is taken off by means of a second capacity of high value, 72, and is utilized in a group of two resistances in series. The positive and negative voltage pulses are not produced at the same moment, but are shifted by ½ period of the complex voltage which I select to be in symmetrical form.

The successive terminals of the generator 61 are generally quite numerous (for example 20 to 60). We must consider here especially, in what follows, the terminal whose rank corresponds to half of this number minus one $$\left( \text{i. e.} \ \frac{20}{2} - 1 = 9 \ \text{for example, or} \ \frac{60}{2} - 1 = 29 \right).$$

I have designated by the same reference numerals, but with an index (1), the elements corresponding to each terminal. Thus, useful voltages are picked up by the aid of the condensers $70_1$ and $72_1$, on the terminal of the rank 9 or 29, for example. We have designated by $70'_1$, $72'_1$, the condensers connected to the terminals of next higher rank.

According to the invention, I connect together corresponding terminals of condensers 70 and $72_1$, and I connect the connected terminals to resistances 71 and 57, which are in series. I proceed in similar manner for the elements of the following terminals, i. e., unite terminals of condensers $70'_1$ and $72'_1$, and connect them to resistances 71' and 57', connected in series, etc.

The positive and negative maximum amplitudes of the voltage pulses in the resistance 57 are limited to an exactly determined value, and according to the principal object of the present invention and as explained hereinbefore, by valves 79 and 80, respectively, polarized by batteries 56 and 60. The common line 53 feeds the condensers 54, 54', corresponding to the different independent channels, each one across a valve 55, 55', etc., and the polarizing battery 56 normally blocks each valve. The drop in voltage in the resistance 57, disposed in series, has the effect of unblocking the channel momentarily and permits the storing of the signal in the condenser 54. I utilize the voltage at the terminals of the condenser 54 to feed the transformer 58 of the first output channel $A_1$. The transformers 58, 58' . . . assures isolation of D. C. voltages and enables matching of impedances.

An identical arrangement is utilized for the other tracks, the same circuit components bearing the same reference numerals, followed by an accent (output channel $A_2$, condenser 54', transformer 58', valve 55', etc.).

To assure the rapid discharge of the condenser 54, I utilize another valve 59, which is normally blocked by the battery 60. The negative trapezoidal pulse which appears across the resistance 57 has the effect of discharging the condenser 54. The same arrangement is adopted for the condensers of the other channels 54', 54'', etc.

Figure 6:
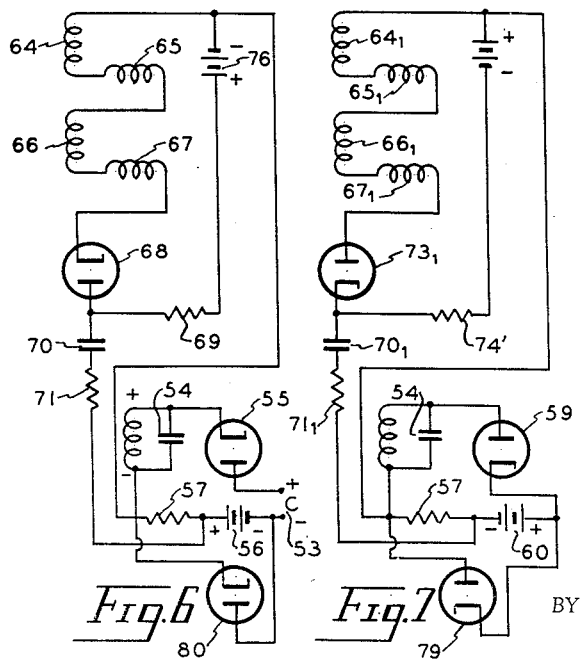
Figures 6 and 7 are schematic partial circuit diagrams, taken from Figure 5.
Figure 7:
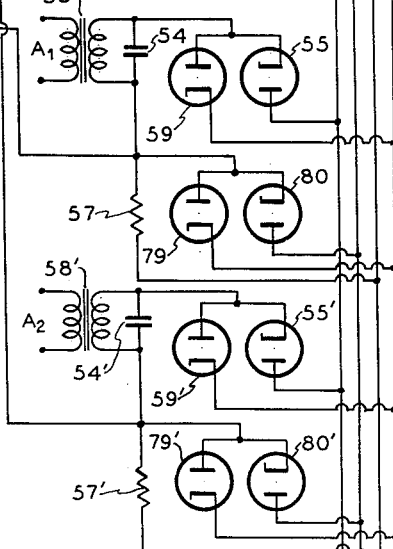

Figures 6 and 7 are simplified circuit diagrams, taken from Figure 5.

Figure 6 contains only the charging circuits of the condenser 54, and affords comprehension of the process of discharging condenser 54, immediately before the arrival of a new pulse, which enables prolongation of the action of the pulse in the channel.

In Figures 6 and 7 I have designated the same parts by the same reference numerals.

The functioning of the device is readily understood by reference to these two figures. At the moment when (see Figure 6, storing) the first impulse arrives in channel 53, the complex voltage generator 64, 65, 66, 67, passes its maximum output, and the valve 68 passes current to resistance 69, generating a positive voltage pulse. Due to the capacitive coupling 70 a positive voltage pulse appears at the terminal of the resistance 57, having the direction of the ± signs in Figure 6. Due to the blocking rectifier 80, this voltage matches exactly the voltage of battery 56. Valve 55 being oriented in such a way as to be able to pass current, the following signal in the input channel 53 charges the condenser 54.

Immediately before the arrival of a new pulse in the input channel 53, the generator of complex voltage $64_1$, $65_1$, $66_1$, $67_1$, passes its negative maximum, and the valve $73_1$ passes current to the resistance $74_1$ in the form of a negative voltage pulse. The capacitive coupling $70_1$, having the same sign indicated on Figure 7, and the unblocking rectifier 79 cause this tension exactly to balance out the battery 60. The valve 59 being oriented in such a direction that it can pass current, the condenser 54 is discharged.

Figure 8:
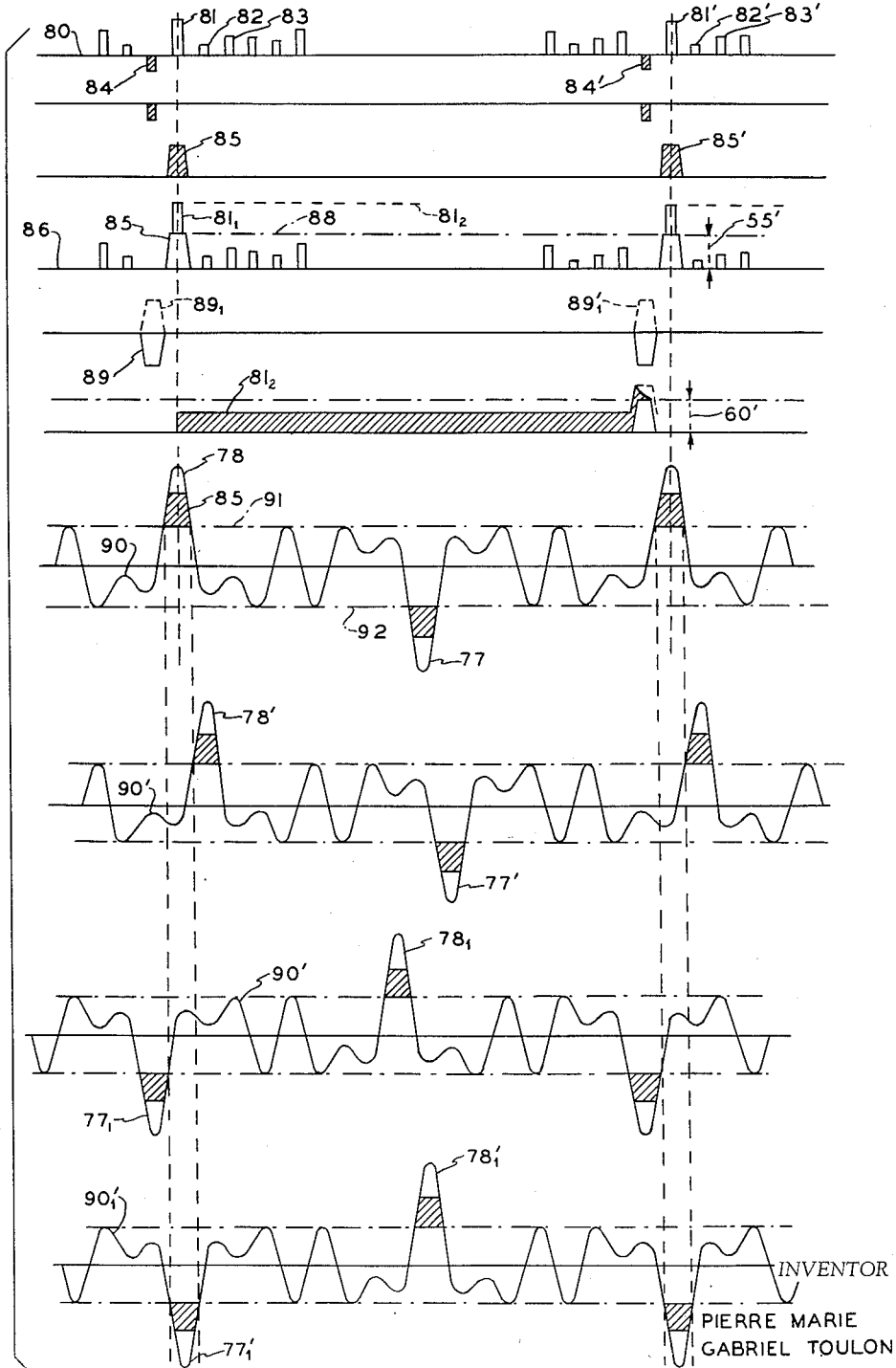
Figure 8 represents, as a function of time, the voltages in the various parts of the diagram of Figure 5.

Figure 8 represents the voltages which appear in the course of time in the different portions of the schematic circuit diagram of Figure 5. I have represented on the first line 80 of this figure, in 81, 82, 83, etc., 81', 82', 83', etc., the pulses which arrive successively via the common line 50. I have represented at 84, 84', the synchronizing pulses. They are, in the present example, of opposite sign to that of the useful signals, which enables their separation in circuit 51.

The second curve represents the synchronizing signal peaks as transmitted by line 52.

The positive trapezoidal pulses corresponding to the first channel, appearing in the resistance 57, is shown on the third line, as 85.

The fourth curve 86 corresponds to the addition of the curves 80 and 85, representing the voltage which appears on the rectifier 55. Beyond the dot-dash line 88 (whose position corresponds to the amplitude 56' of the battery 56), appears only the impulse $81_1$, while all the other impulses which arrive by the common track before or after fail to attain the threshold of functioning of the rectifier. The rectifier 55 has, therefore, the effect of storing in the condenser 54 the signal of the first channel.

I have represented at $81_2$, the effect of the prolongation created by the storing condenser 54.

On the following line of the drawing, I have represented at 89 the trapezoidal pulse of negative sign appearing also on the same resistance 57. This pulse is produced immediately before the arrival of a new pulse, in response to suitable choice of couplings picked in generator 61, as will be seen by the curves at the bottom of the figure.

I have represented in reverse direction, in $89_1$, this same pulse to facilitate explanation, which is justified by the fact that the valves are oriented in the reverse direction.

On the following line, I have reproduced again, at $81_2$, the signal which has been stocked in the condenser 54. The effect of the impulse $89'_1$ adding to this signal, provides the shaded curve. When the voltage becomes positive on valve 59, that is to say when the curve passes the horizontal line 60' corresponding to the voltage of the battery 60, the condenser discharges. I have represented this discharge by a shaded curve on the drawing, as a very rapid asymptotic decrease.

To obtain successively the trapezoidal pulses of opposite sign 85 and 89, which are necessary to discharge the condenser 54, and to store thereafter the pulse in the condenser, I utilize the complex voltage resulting from the superposition of several frequencies. In Figure 8, I have chosen as harmonics 3, 5, and 9, while in Figure 5, I had only represented the synthesis of two voltages; but the principle stays the same.

The complex curve 90 presents alternately a positive peak 78 and negative peak 77. These peaks surpass the levels 91 and 92 at which are fixed the amplitudes of the batteries 75 and 76. I have shaded the part of the pulses of voltage which are utilized. Figure 3 has permitted us to understand how the trapezoidal pulse 85 can be obtained, beginning with the pulse 78. An analogous process permits obtaining the trapezoidal pulses of negative sign.

In Figure 8, I have represented at 90, 90', etc., the complex curves feeding the successive terminals of the generator 61. In the example chosen, distribution is required between 20 independent tracks, and the breadth of the peak has consequently been accordingly chosen. I have represented at $90_1$ the voltage feeding the 9th terminal; in $90'_1$ that which feeds the tenth terminals, etc. The peak $77_1$ permits obtaining the negative impulse 89 described above.

For the following channel 82, I utilize the positive peak 78' and the negative peak $77'_1$, which enables storing and discharging, as has already been described.

The same complex voltage generator can be utilized to feed several separated distributors, each one controlling a common channel and several independent ones. This process is particularly recommended in the case of a distribution in cascade, where the blocking rectifier enables restraining interference between different channels which are fed in parallel, the voltage feeding each distributor being individually limited (valves L and L').

Although I have described and represented several embodiments of the invention, it is quite evident that I do not limit myself to these particular embodiments which are provided as examples only, and without intending to be restricted thereby, and that consequently all variants operating on the same principle as the arrangements above described also fall within the scope of this invention.

Having described my invention, what I claim and desire to secure by Letters Patent is:

1. In a signal distribution system, means for generating a series of timed displaced switching pulses extending from zero value to a predetermined maximum value, means for removing from said pulse that portion thereof extending from zero value to a further predetermined value, to provide a pulse peak, means for clipping said pulse peak to provide a substantially square pulse having its base at said first predetermined value, a rectifier, means for applying said square pulse to said rectifier in series with a signal, and bias means for said rectifier for passing said signal only when said signal is applied in series with said square pulse.

2. In an information bearing signal distribution system, means for generating a series of time displaced switching pulses, means for supplying a series of information bearing signals, means for deriving the peaks of said pulses, means for clipping said peaks to obtain switching signals of predetermined magnitude, means for superposing said switching signals on said information bearing signals, and a normally closed channel for said signals opened only in response to superposed switching signals and information bearing signals to accept said information bearing signals.

3. In a system for distributing signals, occurring in succession, to successive channels, means for generating sinusoidal switching pulses for said channels in succession, means for applying said signals to said channels simultaneously, means for deriving from said switching pulses square pulses of predetermined amplitude, a biased rectifier blocking each of said channels, said biased rectifier biased by a steady voltage of said predetermined amplitude, and means for applying said square pulses to unblock said rectifiers in succession.

4. In a system for distributing signals occurring in succession to successive channels, means for generating a sinusoidal switching pulse for each of said channels, said switching pulses occurring in time succession, a circuit for each switching pulse comprising a biased rectified for passing only the peak of said switching pulse and a resistance for developing a voltage corresponding with said switching pulse, a further biased rectifier shunting said resistor for clipping said voltage to form a square wave having the magnitude of the bias of said further biased rectifier, still a further biased rectifier in each of said channels biased for passing signals in excess of said magnitude only, said signals having magnitudes less than said magnitude, and means for applying said signals to said channels simultaneously.

5. In a system for distributing signals occurring on a single line to a plurality of channels in timed succession, a switching rectifier normally blocking each of said channels and responsive to a switching pulse of predetermined amplitude for unblocking each of said channels for passing signal thereto, means for generating said switching pulses comprising means for generating switching signals by synthesis from a plurality of sine waves, and means for clipping the peaks and the bases of said switching signals to derive said switching pulses of said predetermined amplitude.

6. In a system for distributing signals occurring on a single line to a plurality of channels, in timed succession, a different switching rectifier normally blocking each of said channels, a common bias voltage source for biasing all of said rectifiers against voltage of less than a predetermined magnitude, said signals all having amplitudes less than said predetermined magnitude, means for generating switching signals by synthesis of sinusoidal waves of harmonically related frequencies, means for deriving from each of said switching signals a trapezoidal switching pulse of said predetermined amplitude, and means for applying said switching pulses to unbias said rectifiers in timed succession to enable passage of said signals to said channels in timed succession.

7. In a system for distributing signals occurring on a single line to a plurality of channels, in timed succession, a different switching rectifier normally blocking each of said rectifiers, a common bias voltage source for biasing all of said rectifiers against passage of signals of less than a predetermined magnitude, all of said signals having maximum amplitudes of less than said predetermined magnitude, means for generating switching signals by synthesis of sinusoidal waves of harmonically related frequencies, each of said switching signals having periodic peaks of greater amplitude than the remainder of said each of said switching signals, means for separating said periodic peaks from said switching signals and for clipping said periodic peaks when separated to provide square switching pulses of said predetermined amplitude, and means for applying said switching pulses for unbiasing said rectifiers in timed succession.

8. In a system for distributing signals occurring on a single line to a plurality of channels, in timed succession, a different switching rectifier normally blocking each of said channels, a common bias source for biasing all of said rectifiers to the same voltage and against passage of signals of magnitude less than said voltage, means for generating a switching signal for each of said channels, in mutually displaced time intervals, each of said switching signals comprising an arcuate peak of amplitude greater than said voltage, means comprising rectifiers biased by a common voltage source for deriving said peaks of amplitude, each in a separate switching channel, means for clipping each of said peaks of amplitude to form square pulses of a common value equal to said voltage, and means for applying said square pulses each to unbias one of said first mentioned rectifiers.

9. In a system for distributing signals occurring on a single line to a plurality of condensers and for thereafter discharging each of said condensers at predetermined intervals after charge thereof by one of said signals, comprising a different biased switching rectifier for normally blocking each of said condensers against said signals, means for applying said signals jointly to said rectifiers for passage to said condensers, a common voltage source for applying identical bias to all said biased switching rectifiers, means for generating switching pulses of identical amplitude to unbias said rectifiers in timed succession and in synchronism with said signals, and further switching rectifiers shunting said condensers and poled for discharging said condensers but having a bias for preventing such discharge, and means for overcoming said last named bias at each of said further switching rectifiers to discharge each of said condensers at said predetermined interval after charge thereof.

10. The combination in accordance with claim 9 wherein said means for generating switching pulses comprises means for synthesizing wave shapes from a plurality of harmonically related sinusoidal waves, means for deriving peaks of one polarity only of said wave shapes, and means for clipping said peaks to derive trapezoidal switching pulses.

11. The combination in accordance with claim 10 wherein said means for overcoming said last named bias at each of said further switching rectifiers comprises said means for synthesizing wave shapes and means for deriving peaks only of said wave shapes of polarity opposite to said one polarity, and means for clipping said last mentioned peaks to derive trapezoidal pulses, and means for applying said trapezoidal pulses to said further switching rectifiers.

12. A system for charging and discharging a condenser at timed intervals in accordance with the amplitude of a signal, comprising, a control lead for said condenser, means for applying alternate positive and negative voltages to said control lead, a fixed bias rectifier means normally blocking said condenser against charge in response to said signal, means for connecting said control lead to said rectifier for applying said positive voltage precisely to overcome said fixed bias, whereby said condenser is charged in accordance with the amplitude of said signal, and a further fixed bias rectifier for controlling discharge of said condenser, said control lead connected to apply said negative voltage to overcome bias of said further fixed bias rectifier to discharge said condenser.

13. In a system for charging and discharging a condenser at controlled times, a source of charging current for said condenser, biased rectifier means normally blocking said condenser with respect to charging from said source, further biased rectifier means normally blocking said condenser with respect to discharge of charge accumulated thereby, a single control line, means for applying alternately positive and negative pulses to said control line, means responsive to said positive pulses applied to said control line for unbiasing said first mentioned rectifier means to unblock said condenser with respect to charging, and means responsive to said negative pulse for unbiasing said further biased rectifier for unblocking said condenser with respect to discharge thereof.

PIERRE MARIE GABRIEL TOULON.

REFERENCES CITED

The following references are of record in the file of this patent:

UNITED STATES PATENTS

| Number | Name | Date |
| --- | --- | --- |
| 2,057,773 | Finch | Oct. 20, 1936 |
| 2,365,450 | Bliss | Dec. 19, 1944 |
| 2,426,256 | Zenor | Aug. 26, 1947 |
| 2,428,390 | Smith | Oct. 7, 1947 |
| 2,444,950 | Nicholas et al. | July 13, 1948 |
| 2,471,253 | Toulon | May 24, 1949 |
| 2,479,020 | Pelmulder | Aug. 16, 1949 |